US008110280B2

(12) United States Patent
Graham et al.

(10) Patent No.: US 8,110,280 B2
(45) Date of Patent: Feb. 7, 2012

(54) ADHESIVE COMPOSITION HAVING NON-TACKY MICROSPHERES AND SHEETS MADE THEREFROM

(75) Inventors: Paul D. Graham, Woodbury, MN (US);
Ying-Yuh Lu, Woodbury, MN (US);
Jason D. Romsos, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 924 days.

(21) Appl. No.: 12/056,835

(22) Filed: Mar. 27, 2008

(65) Prior Publication Data

US 2009/0246478 A1 Oct. 1, 2009

(51) Int. Cl.
*B32B 27/00* (2006.01)
(52) U.S. Cl. ............ 428/192; 428/327; 428/36.91; 524/556; 524/555
(58) Field of Classification Search ........... 428/327, 428/36.91, 192; 524/555, 556
See application file for complete search history.

(56) References Cited

U.S. PATENT DOCUMENTS

| 3,314,838 A | 4/1967 | Erwin |
| 3,691,140 A | 9/1972 | Silver |
| 4,376,151 A | 3/1983 | Parrotta |
| 4,556,595 A | 12/1985 | Ochi |
| 4,624,893 A | 11/1986 | Shibano et al. |
| 4,735,837 A | 4/1988 | Miyasaka |
| 4,855,170 A | 8/1989 | Darvell et al. |
| 5,118,759 A | 6/1992 | Jung et al. |
| 5,266,402 A | 11/1993 | Delgado et al. |
| 5,344,693 A | 9/1994 | Sanders |
| 5,487,929 A | 1/1996 | Rusincovitch, Jr. et al. |
| 5,514,122 A | 5/1996 | Morris et al. |
| 5,571,617 A | 11/1996 | Cooprider et al. |
| 5,578,650 A | 11/1996 | Delgado et al. |
| 5,714,237 A | 2/1998 | Cooprider et al. |
| 5,716,685 A | 2/1998 | Kumar et al. |
| 5,719,247 A | 2/1998 | Delgado et al. |
| 5,824,748 A | 10/1998 | Kesti et al. |
| 5,908,693 A | 6/1999 | Delgado et al. |
| 6,194,061 B1 | 2/2001 | Satoh et al. |
| 6,194,064 B1 | 2/2001 | Keely et al. |
| 6,479,073 B1 * | 11/2002 | Lucast et al. ............ 424/448 |
| 2001/0046598 A1 | 11/2001 | Crandall et al. |
| 2006/0188710 A1 | 8/2006 | Windorski et al. |

FOREIGN PATENT DOCUMENTS

GB 2344061 5/2000

(Continued)

OTHER PUBLICATIONS

S. L. Rosen, *Fundamental Principles of Polymeric Materials*, Wiley & Sons, New York, p. 314 (1982).
International Search Report, Application No. PCT/US2009/033548, Feb. 9, 2009.

*Primary Examiner* — Satya Sastri
(74) *Attorney, Agent, or Firm* — Yen T. Florczak; Robert H. Jordan

(57) ABSTRACT

An adhesive blend includes a pressure sensitive adhesive and non-tacky microspheres that function as a detackifier. The non-tacky microspheres are solid, elastomeric, non-crushable, and solvent insoluble. The non-tacky microspheres are a reaction product of at alkyl (meth)acrylate monomers having from 1 to 14 carbon atoms, multifunctional (meth)acrylate and or multifunctional vinyl crosslinker, initiator, and polymeric stabilizer. The blend can be coated onto a sheet to form a pad, such as an easel pad.

11 Claims, 3 Drawing Sheets

FOREIGN PATENT DOCUMENTS

| | | |
|---|---|---|
| JP | 8-319465 | 12/1996 |
| JP | 11-21524 | 1/1999 |
| WO | WO 93/12147 | 6/1993 |
| WO | WO 94/19420 | 9/1994 |
| WO | WO 00/03120 | 1/2000 |
| WO | WO 2005/077672 | 8/2005 |

* cited by examiner

ADHESIVE COMPOSITION HAVING NON-TACKY MICROSPHERES AND SHEETS MADE THEREFROM

BACKGROUND

Self-stick easel pads are important collaborative tools for meetings as they give the meeting participants a medium to write and draw in order to present ideas for discussion. A typical self-stick easel pad includes large sheets of paper (e.g., 25×31 inch) with a stripe of repositionable adhesive coated along one edge of a back surface of the sheet of paper. Multiple sheets are often stacked together to form a pad by having the adhesive stripe of one sheet in contact with a front surface of the next sheet. In some cases, the pad configuration can cause high adhesion between the adjacent sheets thereby complicating a user's ability to advance or flip from one sheet to the next sheet. The adhesion between adjacent sheets can be so high that the adhesive on the flipped sheet does not release from the next sheet. This non-release decreases the writing surface area of the next sheet.

To address the high adhesion problem, some skilled in the art have provided self-stick easel pads with a release liner. The liner separates the adhesive portion of one sheet with the front surface of the next sheet thereby decreasing the resistance encountered when a sheet is flipped. The liner, however, poses an inconvenience when the user wants to remove the sheet from the easel pad and thereafter attach the sheet to a surface, such as a wall, as the user will need to remove the release liner.

Others skilled in the art have used non-adhesive particles. For example, U.S. Pat. No. 4,556,595 (Ochi) discloses a pressure sensitive adhesive having a layer of uniformly dispersed non-adhesive solid particles. The particles have an average diameter less than 10 microns and less than the thickness of the pressure sensitive adhesive layer. The particles can be on the surface or in the surface layer of the pressure sensitive adhesive layer. The pressure sensitive adhesive layer is said to have sufficiently low adhesion strength to permit easy registering on a surface to make possible its relocation to avoid bonding imperfections such as wrinkles, foams, or swellings.

U.S. Pat. No. 5,344,693 (Sanders) discloses a component in the form of a substrate having spacing means extending in a direction outwardly from a surface of the substrate. The spacing means spaces the surface and any substance, such as an adhesive, carried thereon from any other surface when located adjacent to the component. The spacing means has a non-adhesive contactable surface and is non-deformable in normal use of the component.

SUMMARY

The present disclosure provides for a pad of adhesive-backed sheets where a minimal force is required to separate each sheet from the pad, yet the sheets are capable of robust attachment to a variety of surfaces, such as walls, whiteboards, blackboards, and the like, once it is removed from the pad. Furthermore, the adhesive-backed sheets of this disclosure do not adhere to many surfaces until a threshold pressure is applied to the adhesive portion of the sheet. The adhesive backed sheets use an adhesive blend that includes solid, elastomeric, deformable, non-tacky microspheres with a pressure sensitive adhesive. The pressure sensitive adhesive may include a blend of tacky microspheres and an adhesive binder.

As used herein, the term "non-tacky" generally means that the microspheres have a tack value of less than about 5 grams, preferably less than about 3 grams, and more preferably less than about 1 gram, as measured using a texture tack analyzer, as described in the Example section below. The term "elastomeric" can be described as applying to amorphous or non-crystalline materials that can be stretched to at least twice their original length (or diameter) and which will retract rapidly and forcibly to substantially their original dimensions upon release of the force. See S. L. Rosen, *Fundamental Principles of Polymeric Materials*, Wiley & Sons, New York, p. 314 (1982). The term (meth)acrylate includes acrylate and methacrylate.

The non-tacky microspheres of the present disclosure are solid and are non-crushable. They are also substantially not swellable upon exposure to various solvents. Because of the highly crosslinked nature of the non-tacky microspheres, they are solvent insoluble. The non-tacky microspheres of the present disclosure are also deformable, thereby allowing the substrate coated with the non-tacky microspheres to be wound up on itself without creating a hard band on a roll, as further described herein. These various features allow the non-tacky microspheres to be particularly suited as a detackifying agent. Thus, once blended with a pressure sensitive adhesive composition, the non-tacky microspheres of the present invention provide a useful tool to allow one to control the adhesion of the aggregate adhesive.

In one aspect, the present disclosure relates to an adhesive blend comprising: (a) from about 50 to 99 parts by weight pressure sensitive adhesive; and (b) from about 1 to 50 parts by weight non-tacky, elastomeric microsphere. The non-tacky micropshere comprises the reaction product of: (1) from about 50 to 99 parts by weight alkyl(meth)acrylate monomer having from about 1 to 14 carbon atoms; (2) from about 1 to 50 parts by weight multifunctional crosslinker selected from the group consisting of di(meth)acrylates, tri (meth)acrylates, tetra(meth)acrylates, divinylbeneze, and combinations thereof; (3) from about 0.01 to 4.0 wt % initiator; and (4) from about 0.01 to 3 wt % polymeric stabilizer, wherein the parts by weight of components (b)(1) and (b)(2) equal 100 parts total, and (b)(3), and (b)(4) are wt % based on the total weight of components (b)(1) and (b)(2).

BRIEF DESCRIPTION OF THE DRAWINGS

The present disclosure can be better understood with reference to the drawings, wherein.

Figure 1:
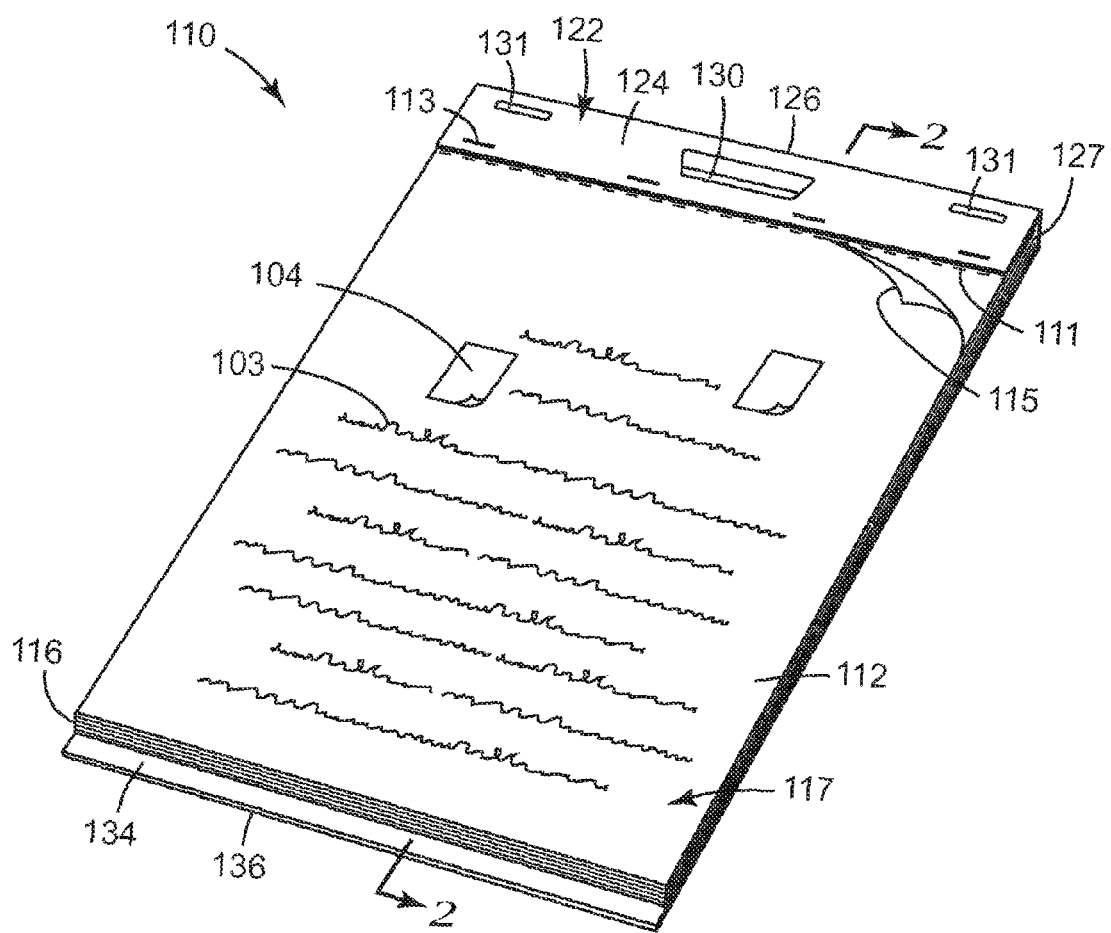
FIG. 1 is a perspective view of an embodiment of a pad according to the present disclosure.

These figures are idealized, are not drawn to scale, and are intended for illustrative purposes.

DETAILED DESCRIPTION

In this document, all numbers herein are assumed to be modified by the term "about". The recitation of numerical ranges by endpoints includes all numbers subsumed within that range (e.g., 1 to 5 includes 1, 1.5, 2, 2.75, 3, 3.8, 4, and 5).

There are two primary components used in the adhesive blend, the non-tacky microspheres and the pressure sensitive adhesive. Other components can be used, including but not limited to, modifiers, such as rheology modifiers, colorants, fillers and other polymeric additives. If such modifiers are used, the amounts used in the adhesive mixture are amounts effective for the known uses of such modifiers.

Non-Tacky Microsphere

The non-tacky microspheres of the present disclosure can be prepared in water by a suspension polymerization process by polymerizing at least one alkyl(meth)acrylate monomer having from about 1 to 14 carbon atoms, at least one multifunctional crosslinker, at least one initiator, and at least one polymeric stabilizer. Other optional components can be used in the reaction mixture, including but not limited to, surfactants.

The adhesive blend of the present disclosure will typically have from 1 to 50 parts by weight, preferably from 3 to 12 parts by weight of the non-tacky microsphere, based on the total weight of the pressure sensitive adhesive and non-tacky microsphere.

Alkyl (meth)acrylate polymerizable monomers having from 1 to 14 carbon atoms are used in the reaction mixture to prepare the non-tacky microsphere. The alkyl (meth)acrylate monomer is presented in amounts ranging from 50 to 99 parts, preferably 75 to 95 parts by weight per 100 parts of the polymerizable monomer. Suitable alkyl(meth)acrylate monomer is selected from the group consisting of isooctyl acrylate, isononyl (meth)acrylate, isoamyl (meth)acrylate, isodecyl (meth)acrylate, 2-ethylhexyl acrylate, n-butyl (meth)acrylate, sec-butyl (meth)acrylate, propyl(meth)acrylate, ethyl (meth)acrylate, methyl (meth)acrylate, isobornyl (meth)acrylate, 4-methyl-2-pentyl (meth)acrylate, 2-methylbutyl (meth)acrylate, t-butyl (meth)acrylate, and combinations thereof.

Suitable multifunctional crosslinkers include, but are not limited to, di(meth)acrylates, tri(meth)acrylates, tetra(meth)acrylates, divinylbeneze, and combinations thereof. Nonlimiting examples of multifunctional crosslinkers include 1,6-hexanediol di(meth)acrylates, butanedioldi(meth)acrylates, poly(ethylene glycol) di(meth)acrylates, polybutadiene di(meth)acrylates, polyurethane di(meth)acrylates, propoxylated glycerin tri(meth)acrylates, divinylbenzene, and combinations thereof. The crosslinker is present in amounts ranging from 1 to 50 parts, preferably from 5 to 25 parts by weight per 100 parts of the polymerizable monomers. The multifunctional crosslinkers form a part of the polymerizable monomers in the preparation of the non-tacky microspheres.

Initiators are used in the reaction mixture to prepare the non-tacky microsphere. Initiators affecting polymerization are those that are normally suitable for free-radical polymerization of the polymerizable monomers. When the (meth)acrylate monomers are used, in whole or in part, as the polymerizable monomers, suitable initiators include, but are not limited to, thermally-activated initiators such as azo compounds, hydroperoxides, peroxides and the like. Suitable photoinitiators include, but are not limited to, benzophenone, benzoin ethyl ether and 2,2-dimethoxy-2-phenyl acetophenone. Other suitable initiators include lauroyl peroxide and bis(t-butyl cyclohexyl)peroxy dicarbonate.

The initiator is present in a catalytically effective amount sufficient to bring about high monomer conversion in a predetermined time span and temperature range. Typically, the initiator is present in amounts ranging from 0.01 to approximately 4 parts per weight per 100 parts by weight of the polymerizable monomer. Parameters that affect the concentration of initiator used include the type of initiator and particular polymerizable monomers involved. It is believed that catalytically effective concentrations range from about 0.03 to about 2 parts by weight and more preferably, from about 0.05 to about 0.50 parts by weight per 100 parts of the polymerizable monomers.

Polymeric stabilizers are used in the reaction mixture to prepare the non-tacky microsphere. Advantageously, the presence of the stabilizer permits the use of relatively low amounts of surfactants while still obtaining microspheres.

Any polymeric stabilizer that effectively provides sufficient stabilization of the final polymerized droplets and prevents agglomeration within a suspension polymerization process is useful in this disclosure. The polymeric stabilizer will typically be present in the reaction mixture in an amount by weight of about 0.01 to about 3 parts by weight per 100 parts of polymerizable monomer, and more preferably will be present in an amount by weight of about 0.04 to about 1.5 parts by weight per 100 parts of polymerizable monomer.

Suitable polymeric stabilizers include, but are not limited to, salts of polyacrylic acids of greater than 5000 number average molecular weight (e.g., ammonium, sodium, lithium and potassium salts), carboxy modified polyacrylamides (e.g., Cyanamer® A-370 from American Cyanamid), copolymers of acrylic acid and dimethylaminoethylmethacrylate and the like, polymeric quaternary amines (e.g., General Alanine and Film's Gafquat® 755, a quaternized polyvinyl-pyrollidone copolymer, or Union Carbide's "JR-400", a quaternized amine substituted cellulosic), cellulosics, and carboxymodified cellulosics (e.g., Hercules' Natrosol® CMC Type 7L, sodium carboxy methycellulose), and polyacrylamide (e.g., Cyanamer N300 from Cytek).

Surfactants may be used in the reaction mixture to prepare the non-tacky microsphere. The surfactant will typically be present in the reaction mixture in an amount no greater than about 5 parts by weight per 100 parts by weight of polymerizable monomer content, preferably no greater than about 3 parts by weight, and most preferably in the range of 0.2 to 2 parts by weight per 100 parts by weight of polymerizable monomer.

Useful surfactants include anionic, cationic, nonionic or amphoteric surfactants. Useful anionic surfactants include, but are not limited to, alkyl aryl sulfonates, e.g., sodium dodecylbenzene sulfonate and sodium decylbenzene sulfate, sodium and ammonium salts of alkyl sulfates, e.g., sodium lauryl sulfate, and ammonium lauryl sulfate. Useful nonionic surfactants include, but are not limited to, ethoxylated oleoyl alcohol and polyoxyethylene octylphenyl ether. Useful cationic surfactants include, but are not limited to, a mixture of alkyl dimethylbenzyl ammonium chlorides wherein the alkyl chain contains from 10 to 18 carbon atoms. Useful amphoteric surfactants include, but are not limited to, sulfobetaines, N-alkylaminopropionic acids, and N-alkybetaines.

The non-tacky microspheres of the present disclosure are prepared by suspension polymerization. Suspension polymerization is a procedure wherein monomers are dispersed in a medium (usually aqueous) in which they are insoluble. The polymerization is allowed to proceed within the individual monomer droplets. Monomer soluble free-radical initiators are preferably used.

To initiate the polymerization reaction, a sufficient number of free radicals are present. This may be achieved through several means, such as heat or radiation free-radical initiation. For example, heat or radiation can be applied to initiate the polymerization of the monomers, which results in an exothermic reaction. However, it is preferred to apply heat until thermal decomposition of the initiators generates a sufficient number of free radicals to begin the reaction. The temperature at which this occurs varies greatly depending upon the initiator used.

In addition, deoxygenation of the polymerization reaction mixture is often desirable. Oxygen dissolved in the reaction mixture can inhibit polymerization and it is desirable to expel the dissolved oxygen. Although, an inert gas bubbled into the reaction vessel or through the reaction mixture is an effective means of deoxygenation, other techniques for de-oxygenation that are compatible with suspension polymerization can be used. Typically, nitrogen is used to deoxygenate, although any of the Group VIIIA (CAS version) inert gases are also suitable.

While specific time and stirring speed parameters are dependent upon monomers, and initiators, it may be desirable to pre-disperse the reaction mixture until the reaction mixture reaches a state where the average monomer particle diameter size is between about 1 and 300 micrometer, and preferably between 20 and 150 micrometer. The average particle size tends to decrease with increased and prolonged agitation of the reaction mixture.

Preferably, stirring and nitrogen purge are maintained throughout the reaction period. Initiation begins by heating the reaction mixture. Following polymerization, the reaction mixture is cooled.

In a one-step process both the polymerizable monomers and initiators are present together in the suspension at the initiation of polymerization. The other components, such as stabilizers, surfactants and modifiers (if used) are present in the reaction medium.

Following polymerization, a stable aqueous suspension of the non-tacky microspheres at room temperature is obtained. The suspension may have non-volatile solids contents of from about 10 to about 70 percent by weight. The aqueous suspension may be used immediately following polymerization because the suspension of non-tacky microspheres is particularly stable to agglomeration or coagulation. The non-tacky microspheres are blended with any pressure sensitive adhesive to form the adhesive blend.

Pressure Sensitive Adhesive

The adhesive blend of the present disclosure can be used with any pressure sensitive adhesive composition. The pressure sensitive adhesive can be solvent based, water based, or a hot melt, so long as the non-tacky microspheres are compatible and stable therein. In one embodiment, the pressure sensitive adhesive is a repositionable adhesive.

The adhesive blend of the present disclosure will typically have from 50 to 99 parts by weight, preferably from 75 to 97 parts by weight of the pressure sensitive adhesive composition, based on the total weight of the pressure sensitive adhesive and the non-tacky microsphere.

A suitable pressure sensitive adhesive for use in the adhesive blend of the present disclosure is described in PCT Publication WO 94/19420. The publication describes a repositionable pressure sensitive adhesive composition comprising a blend of one or more polymeric, inherently tacky, elastomeric microspheres and an adhesive binder comprising at least one acrylamide-based moiety.

The tacky microspheres should comprise at least one alkyl (meth)acrylate ester. Alkyl (meth)acrylate monomers useful in preparing the solid tacky microspheres for pressure-sensitive adhesives are monofunctional unsaturated (meth)acrylate esters of non-tertiary alkyl alcohols, the alkyl groups having from 4 to 14 carbon atoms. Such acrylates are oleophilic, water emulsifiable, and have restricted water solubility. As homopolymers, they generally have a glass transition temperature below about −20° C. Included within this class of monomers are, for example, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate and combinations thereof.

Preferred acrylates include isooctyl acrylate, isononyl acrylate, isoamyl acrylate, isodecyl acrylate, 2-ethylhexyl acrylate, n-butyl acrylate, sec-butyl acrylate, and mixtures thereof. (Meth)acrylate or other vinyl monomers which, as homopolymers, have glass transition temperatures higher than about −20° C., e.g., tert-butyl acrylate, isobornyl acrylate, butyl methacrylate, vinyl acetate, N-vinyl pyrolidone, acrylamide, and the like, may be used in conjunction with one or more of the (meth)acrylate monomers, provided that the glass transition temperature of the resultant polymer is below −20° C.

Preferred tacky microspheres are described in U.S. Pat. Nos. 3,691,140; 5,714,237; and 5,824,748, all of which are incorporated by reference. These microspheres use at least one monomer selected from the group consisting of substantially oil-insoluble, water soluble, ionic monomers and maleic anhydride. The monomers can be used alone, as a mixture of two or more ionic monomers or as a mixture of maleic anhydride and one or more ionic monomers. Examples of ionic monomers include, but are not limited to, sodium methacrylate, ammonium acrylate, sodium acrylate, trimethylamine p-vinyl benzimide, 4,4,9-tri-methyl-4-azonia-7-oxo-8-oxa-dec-9-ene-1-sulphonate, N.N-dimethyl-(β-methacyloxoxyethyl)ammonium propionate betaine, trimethylamine methacrylamide.

Tacky microspheres can be prepared by an aqueous suspension polymerization technique using emulsifiers in an amount greater than the critical micelle concentration. Critical micelle concentration is defined as that minimum emulsifier concentration necessary for the formation of micelles. The critical micelle concentration is slightly different for each emulsifier. Useable concentrations typically range from $1.0 \times 10^{-4}$ to 3.0 moles per liter. Anionic, nonionic or cationic emulsifiers can be used. Typical examples of anionic emulsifiers include sodium dodecylbenzene sulfonate, sodium salts of alkyl aryl ether sulfonates and the like. Examples of nonionic emulsifiers include ethoxylated oleyl alcohol and polyoxyethylene octylphenyl ether. An example of a cationic emulsifier is a mixture of alkyl dimethylbenzyl ammonium chloride, where the alkyl chain is from ten to eighteen carbons long. While only examples of anionic, nonionic and cationic emulsifiers are given herein, it is believed that amphoteric emulsifiers would likewise work.

Initiators effecting polymerization are those which are normally suitable for free-radical polymerization of acrylate monomers. Non-limiting examples of such initiators include thermally-activated initiators such as azo compounds, hydroperoxides, peroxides and the like and photoinitiators such as benzophenone, benzoin ethyl ether, and 2,2,-dimethoxy-2-phenyl acetophone. Other suitable initiators include lauryl peroxide and bis(t-t-butyl cyclohexyl)peroxy dicarbonate. The initiator concentration should be sufficient to bring about a substantially complete monomer conversion in a desired time span and temperature range. Parameters that affect the concentration of initiator used include the type of initiator and particular monomer(s) involved. It is believed that effective concentrations range from 0.10 to 1 percent, preferably from 0.25 to 0.70 percent by weight of the total monomers. Polymeric stabilizers may also be used, if desired. Heat or radiation can be applied to initiate the polymerization of the monomers, which is an exothermic reaction.

The tacky microsphere composition may also contain a crosslinking agent. Examples of useful crosslinking agents include, but are not limited to: multifunctional (meth)acrylate (s), e.g., butanediol diacrylate or hexanediol diacrylate or other multifunctional crosslinkers such as divinylbenzene, and mixtures thereof. When used, crosslinker(s) is (are) added at a level of up to 0.15 equivalent weight percent, preferably up to 0.1 equivalent weight percent, of the total polymerizable composition. The "equivalent weight percent" of a given compound is defined as the number of equivalents of that compound divided by the number of equivalents in the total composition, wherein the equivalent is the number of grams divided by the equivalent weight.

Following polymerization, a stable aqueous suspension of solid tacky microspheres at room temperature is obtained. The suspension may have non-volatile solids contents from 10 to 65 percent by weight. Upon prolonged standing, the suspension separates into two phases, one being aqueous and the other being an aqueous suspension of the polymeric tacky microsphere. The aqueous suspension of tacky microspheres may be used immediately following polymerization, if desired. The tacky microsphere-rich phase can be isolated, and provide an aqueous suspension having a non-volatile solids content, which if shaken, will readily redisperse.

Alternatively, the suspension may be coagulated with an organic liquid such as methanol, followed by washing and drying. These partially dried polymer spheres, with sufficient agitation, will readily suspend in a variety of common organic solvents such as ethyl acetate, tetrahydrofuran, heptane, 2-butanone, benzene cyclohexane and esters.

Suitable adhesive binders include polymers having at least one acrylamide-based moiety. Suitable acrylamides include the reaction products of a (meth)acrylic acid with ammonia or primary or secondary amines. Examples of suitable acrylamides include, but are not limited to, acrylamide, isooctyl acrylamide, 2-ethyl hexyl acrylamide, and N,N-dimethyl acrylamide.

If desired, the acrylamides can be copolymerized with one or more monomers having vinyl groups. Any vinyl monomer may be used so long as the product acts as a binder for the microspheres and does not deleteriously inhibit the pressure sensitive adhesive. Suitable monomers include alkyl (meth) acrylates. Alkyl (meth)acrylate monomers useful in preparing the binder are those monofunctional unsaturated (meth) acrylate esters of non-tertiary alkyl alcohols, the alkyl groups of which have from 4 to 14 carbon atoms. Examples of such monomers include esters of (meth)acrylic acid with non-tertiary alkyl alcohols such as 1-butanol, 1-pentanol, 2-methyl-1-butanol, 1-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol, isooctyl alcohol, isononyl alcohol, 2-ethyl-hexyl alcohol, and the like. Such monomeric (meth) acrylic esters are known in the art and many are commercially available.

Preferably, the binder comprises up to about 15 parts acrylamide and from 85 to 100 parts by weight (meth)acrylic ester. More preferably, the binder comprises from 4 to 10 parts acrylamide and from 90 to 96 parts (meth)acrylic ester.

The pressure sensitive adhesive is made by combining the adhesive binder with the tacky microspheres. If an organic dispersion of the adhesive is desired, a solution of binder is combined with an organic dispersion of the tacky microspheres. If an aqueous adhesive composition is desired, an aqueous suspension of the tacky microspheres is combined with an aqueous solution of binder. Preferably, the weight of the binder comprises from 10 to 90 parts by weight of the adhesive and the tacky microspheres comprise from 10 to 90 parts by weight of the pressure sensitive adhesive.

Properties of the pressure sensitive adhesive can be altered by the addition of a tackifying resin(s) and/or plasticizer(s). Preferred tackifiers for use herein include hydrogenated rosin esters commercially available from such companies as Hercules, Inc. under the tradenames Foral™ and Pentalyn™. Individual tackifiers include those based on t-butyl styrene. Useful plasticizers include dioctyl phthalate, 2-ethyl hexyl phosphate, tricresyl phosphate, and the like. Optionally, colorants, fillers, stabilizers and various other polymeric additives can be used.

Sheets

Suitable substrates or sheets for use in the present disclosure include, but are not limited to, paper, plastic films, cellulose acetate, ethyl cellulose, woven or nonwoven fabric comprised of synthetic or natural materials, metal, metallized polymeric film, ceramic sheet material and the like. Generally the backing or substrate material is 25 to 155 micrometer in thickness, although thicker and thinner backing or substrate materials are not precluded. Typically the adhesive blend will be applied or coated to at least a portion of a second side of the sheet forming the adhesive coating. In some embodiments, such as the pads described below, a release coating is applied to a first side of the sheet generally in an area opposing the adhesive blend. Furthermore, when the sheets are used to form an easel pad, the first surface of the sheet may include a bleed through resistant coating. This first surface is typically the writing surface. Once coated on the sheet, the average diameter of the non-tacky microsphere is greater than the thickness of the adhesive coating. Thus, at least a portion of the microspheres protrude from the adhesive coating.

The adhesive blend of the present disclosure can be applied to the substrate using conventional coating techniques, such as slot die coating, wire-wound rod, direct gravure, offset gravure, reverse roll, air-knife, spray coat, and trailing blade coating.

Now turning to the figures, FIG. 1 shows an exemplary pad of the present disclosure, generally designated as 110, which can be referred to as a "flip chart" or an "easel pad". The pad can be supported on an easel stand (not shown) and located in a room during a meeting and used to record lists of items, or ideas generated during a meeting. Although these figures show an easel pad, other types of pads can be used, including pads of paper notes (typically less than 6 inch in length) or pads of meeting notes (typically about 6 to 8 inch in length).

The pad 110 has a plurality of flexible sheets 112, e.g., 30 sheets. Each sheet is generally of the same size having first (front) and second (rear) surfaces having, upon removal from the pad 110, peripheral edges including opposing first and second edges 115, 116. A band of adhesive 118 is disposed on the second surface of the sheet adjacent to and spaced from the first edge 115. In this embodiment, the band of adhesive includes a single stripe of adhesive blend. The sheets are disposed in a stack 117 with the corresponding peripheral edges of the sheets aligned and with the first and second surfaces of adjacent sheets facing each other. The first edge 115 of the sheet is defined by perforations 111. Optionally, a band of release coating 107 is disposed on the first surface of each sheet generally in an area opposing the band of adhesive 118.

The pad 110 further includes a back card 122, typically made of a stiffer material than the sheets. The front surface of the back card is generally coextensive with the sheets 112. The back card has a top portion 124 projecting past the aligned top edges 127 of the sheets. The top portion 124 has a peripheral support edge 126. In a typical easel pad, the top portion has an elongate through opening 130 providing a convenient handle for the pad. Optionally, the top portion 124 has one or more slots 131 being adapted to receive the support pegs that are used on some types of easel stands. Optionally, the back card has a bottom portion 134 projecting past the second edges 116 of the sheets. Optionally staples 113 extend through the top portion 124 of the back card, through the sheets and the back of the back card. After writing 103 and or placing repositionable notes 104 on the front surface of a top sheet, a user can peel the top sheet away from an adjacent sheet by tearing along the perforation or the user can flip the sheet over the support edge 126 to expose the next sheet.

Figure 2:
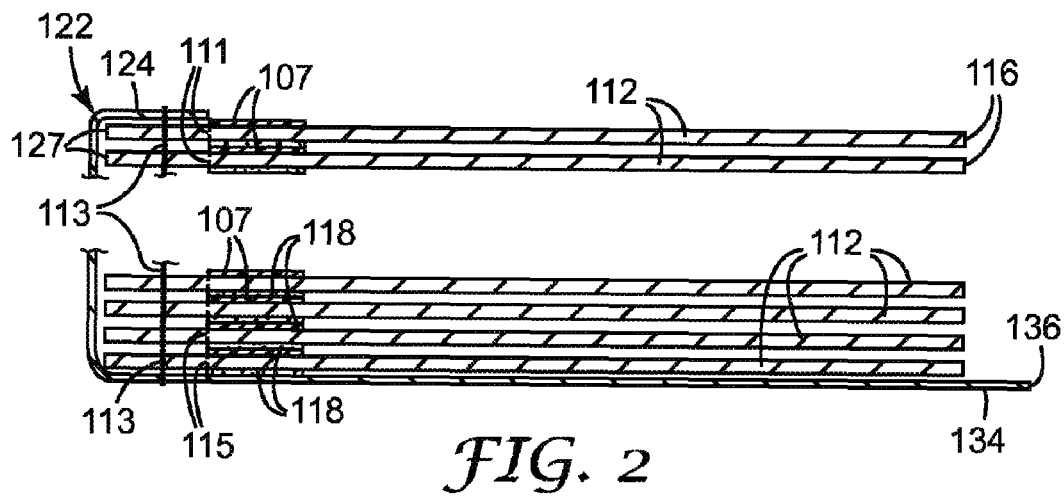
FIG. 2 is a cross-sectional view of the embodiment of FIG. 1 taken along line 2-2.

FIG. 2 shows a cross-sectional view of the pad of FIG. 1 taken along line 2-2 where a number of sheets towards the center of the pad have been removed for ease of understanding.

Figure 3:
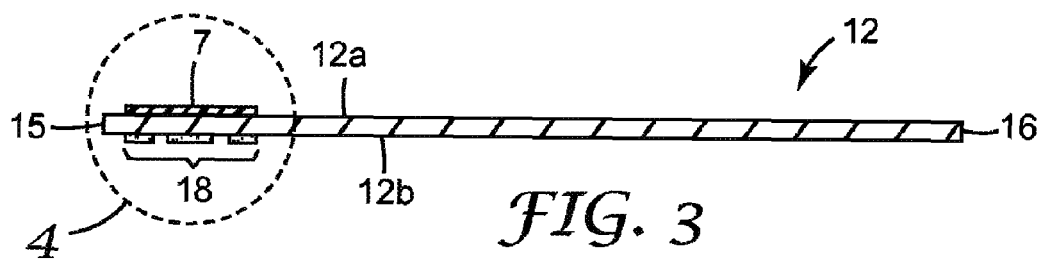
FIG. 3 is a side view of another exemplary sheet according to the present disclosure.
Figure 4:
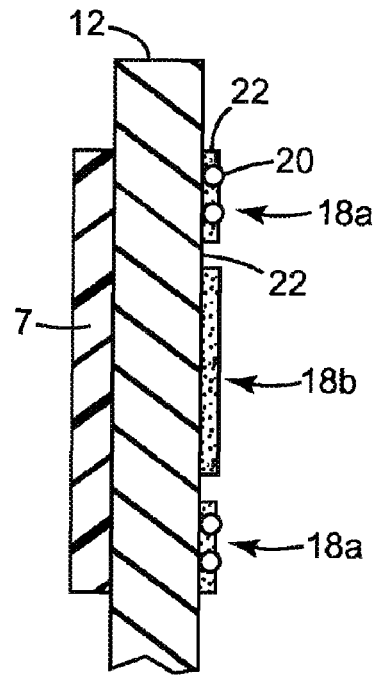
FIG. 4 is an exploded view of an adhesive region on the second surface of the sheet of FIG. 3.

FIG. 3 shows a side view of another exemplary sheet 12 that can be used to form a pad of sheets. The sheet has opposing first and second peripheral edges 15, 16 and opposing first (front) and second (rear) surfaces 12a, 12b. Spaced from a first edge 15 of the sheet are several stripes of adhesives forming an aggregate band of adhesive 18. Optionally, on the front surface 12a of the sheet, there is a band of release coating 7 disposed on substantially the same position but on the opposite side of the adhesive band 18. FIG. 4 shows an exploded view of the sheet of FIG. 3 focusing in on stripes of adhesive forming the band 18. The adhesive band includes a wide stripe 18b sandwiched between two narrow stripes 18a with a gap between each of the stripes. However, if desired, the stripes 18a and 18b can be disposed immediately adjacent to one another thereby eliminating the gap therebetween. In this particular embodiment, the wide stripe 18b is a pressure sensitive adhesive 22 having tacky microspheres dispersed in an adhesive binder. The narrow stripes of adhesive 18a include a blend of the pressure sensitive adhesive 22 (used in the wide stripe) and non-tacky microsphere 20. The adhesive 22 covers a portion of the non-tacky microsphere so that some of the non-tacky microsphere protrudes above or extends from a front surface of the pressure sensitive adhesive 22. The average diameter of the non-tacky microsphere is larger than the coating thickness of the pressure sensitive thickness thereby allowing a portion of the non-tacky microsphere to protrude beyond an exposed surface of the adhesive. The combination of the narrower width of the stripes 18a and the use of the non-tacky microsphere results in lower adhesion for the stripes 18a as compared to stripes 18b.

Figure 5:
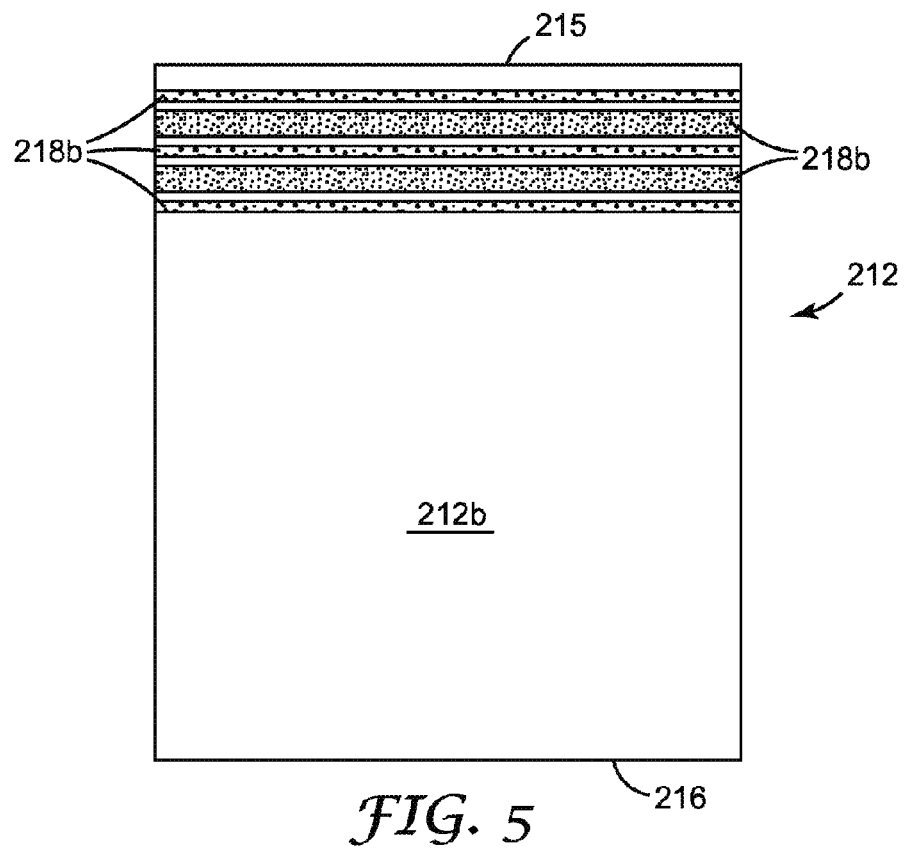
FIG. 5 is a plan view of another exemplary sheet according to the present disclosure.

FIG. 5 shows a top plan view of a second (rear) surface 212b of another exemplary sheet 212. In this embodiment, there are five stripes of adhesive, alternating between narrow and wide stripes, 218a, 218b with a gap between each of the stripes. The types of adhesive used in this configuration can be the same as that described in FIG. 4.

Figure 6:
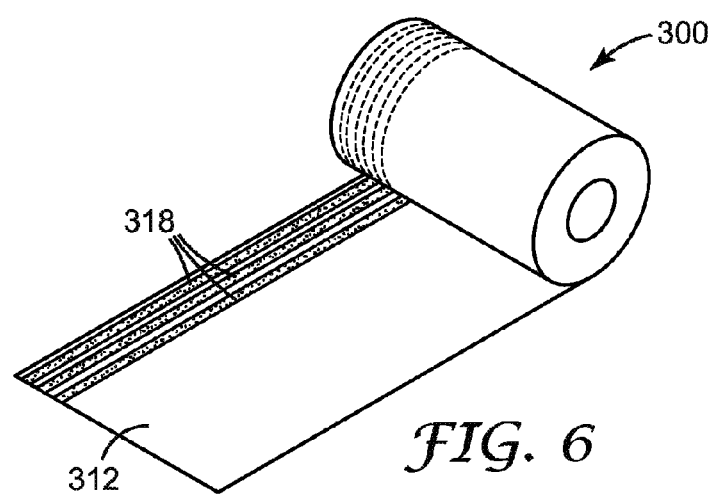
FIG. 6 is a perspective view of another embodiment according to the present disclosure.

FIG. 6 shows a perspective view of another exemplary embodiment of the present disclosure, wherein the sheet is in jumbo or roll form. In one exemplary method for making sheets that will eventually form the pad 110 of FIG. 1, a roll of input paper is unwound and fed into a coating device. The input paper may have been previously coated with at least one of a bleed through resistant coating and a release coating on its first surface. An exemplary bleed through resistant coating is disclosed in U.S. Pat. No. 5,716,685 (Kumar et al.), the disclosure of which is incorporated by reference. The adhesive blend of the present disclosure and a pressure sensitive adhesive are coated onto the paper as one stripe or multiple continuous stripes 318 along one edge (typically referred to as "downweb") of the paper on its second surface. Once the adhesive blend and the pressure sensitive adhesive are dried, the adhesive coated paper 312 is typically wound up into a semi-finished jumbo 300 with the adhesive stripes (shown in phantom on the jumbo) aligned substantially on top of one another along one edge of the roll. In a later step, the semi-finished jumbo is unwound and sheets of desired size are cut from the jumbo. It has been unexpectedly found that the adhesive blend of the present invention, after coated onto the paper and wound into the semi-finished roll, forms little to no hard band on the roll. It is believed that two factors primarily contribute to this effect. The first factor is due to the deformable nature of the non-tacky microspheres, which allows them to compress when upon winding of the coated paper into a roll. The second factor is that the non-tacky microspheres are discrete particles when coated onto the paper substrate, thereby also helping to minimize any hard band formation. While there may be some surface non-uniformity on the paper at the adhesive coated end that can be physically detected by touch, upon unwinding the semi-finished jumbo for further processing, there are little to no deformities on impressions left on the paper.

The presence of a hard band is undesirable because it limits the amount of paper that can be wound to form the roll. This limitation introduces cost into the manufacturing process, because instead of having the flexibility of making one large semi-finished roll, in order to avoid the hard bands, multiple smaller rolls are made. Furthermore, hard bands, if severe enough, can cause cracks in the paper rendering it unusable for any finished products.

EXAMPLES

Polymerization Process for Non-Tacky Microsphere

The non-tacky microspheres were prepared by charging the ingredients in Table 1 into a 4-neck flask equipped with a reflux condenser, thermometer, stirrer, and a nitrogen gas inlet. The mixture was then mixed at 350 revolutions per minute for 30 minutes to achieve a desired monomer droplet size of 80 micrometer. Once the monomer droplet size is in the specification, as determined by optical microscopy, the suspension was heated to an initiation temperature of 45° C. under a nitrogen atmosphere to initiate the polymerization. The reaction was allowed to exotherm. After polymerization, the batch was cooled to room temperature and filtered through a cheese cloth to remove coagulum. The volume average of the particle size diameter of the microsphere was 81 micrometer, as measured by a particle size analyzer, Horiba LA910. The non-tacky microspheres were allowed to settle by gravity thereby separating the water phase and the microsphere phase. The water phase was decanted and replaced with isopropyl alcohol (IPA). The non-tacky microspheres were re-dispersed in IPA with mild agitation.

TABLE 1

Components for non-tacky microsphere

| Component function | Component | Amount (grams) |
| --- | --- | --- |
| polymerizable monomer | isooctyl acrylate | 286.40 |
| multifunctional crosslinker | 1,6 hexanediol diacrylate | 71.60 |
| reaction medium | deionized water | 430.00 |
| surfactant | Hitenol BC-1025 | 5.28 |
| surfactant | Stepanol AMV, ammonium lauryl sufate | 4.78 |
| polymerizable monomer | sodium styrene sulfonate | 0.66 |
| initiator | Luperox A75 | 0.54 |

TABLE 1-continued

Components for non-tacky microsphere

| Component function | Component | Amount (grams) |
|---|---|---|
| initiator | Perkodox 16 | 0.30 |
| polymeric stabilizer | Cyanamer N-300 | 0.40 |
| pH buffer | sodium bicarbonate | 0.26 |

Luperox A75: benzoyl peroxide from Arkema, Philadephia, Pennsylvania
Perkodox 16: di(4-tert-butylcyclohexyl) peroxydicarbonate from Akzo Nobel, Amsterdam, the Netherlands
Hitenol BC-1025: polyoxyethylene aklylphenyl ether ammonium sulfate from Montello Inc., Tulsa, Oklahoma
Stepanol AMV: ammonium lauryl sufate from Stepan Co., Northfield, Illinois
Cyanamer N-300: polyacrylamide from Cytek Tack Test for Non-Tacky Microsphere The non-tacky microspheres as described in Table 1 were dried to form a powder of non-tacky microspheres. The microsphere powder was then dusted on to the adhesive side of a 3M™ Scotch® 355 tape (available from 3M Company, St. Paul, Minn.). The microspheres formed a monolayer of particles on the adhesive surface. Excess microspheres were removed. The tack of the microspheres was measured using a TA-XT2i Texture Analyzer, available from Texture Technologies, Corp., as follows.

The tape, with the monolayer of non-tacky microspheres facing up was held in a brass fixture. A 7 mm stainless steel probe is brought into contact with the tape until 100 gram force is reached. After one second contact time, the probe is raised at a speed of 0.5 mm per second and the force of adhesion is measured as a function of the distance of the probe from the tape. The tack was then recorded at peak removal force (in grams).

With this test method, the non-tacky microspheres as described above and in Table 1, had a tack of 0.2 gram.

Pressure Sensitive Adhesive

The pressure sensitive adhesive included two components: tacky microspheres dispersed in an adhesive binder.

The tacky microspheres were prepared in water by charging in to a flask equipped with a reflux condenser, thermometer, and stirrer, 307.69 grams of distilled water, 2.05 grams of ammonium lauryl sulfate and 2.56 grams of acrylic acid to form a mixture. The mixture was neutralized with a sufficient amount of ammonium hydroxide to achieve a pH of 7.0, then heated to 70° C. Thereafter, 100 grams of isooctyl acrylate and 0.31 grams of benzoyl peroxide were added to the mixture. The mixture was stirred at a specified mixing rate to yield sufficient particle size. The reaction was then cooled to 65° C. until the reaction exothermed. After polymerization, the mixture was allowed to cool for seven hours at 60° C. The polymerized mixture was filtered and allowed to separate into two layers. The top layer was coagulated with isopropyl alcohol, which was then extracted. The tacky microspheres were then redispersed in heptane.

The adhesive binder was prepared by charging into a flask 155.61 grams of ethyl acetate, 100 grams isooctyl acrylate, 4.15 grams acrylamide, 0.22 gram benzoyl peroxide, and 180.57 grams of heptane. The mixture was heated at 59° C. for 48 hours. Thereafter, 0.66 grams of ethyl acetate and 0.49 gram of Santanox, an antioxidant, was added.

The pressure sensitive adhesive was made by mixing an equal amount by solids of the tacky microsphere and the adhesive binder.

Example 1

An adhesive blend was made by mixing 23 parts by weight of the pressure sensitive adhesive having 35% solids and 1 part by weight of the non-tacky microsphere having 51% solids for a 94:6 pressure sensitive adhesive to non-tacky microsphere ratio.

Example 2

An adhesive blend was made by mixing 10.7 parts by weight of the pressure sensitive adhesive having 35% solids and 1 part by weight of the non-tacky microsphere having 51% solids for a 88:12 pressure sensitive adhesive to non-tacky microsphere ratio.

Comparative Example 1

No adhesive blend was used in this comparative example so that the only adhesive used was the pressure sensitive adhesive described above having the tacky microspheres mixed with the adhesive binder.

Each of the adhesive blend of Examples 1 and 2 and the pressure sensitive adhesive of Comparative Example 1 was coated onto 20 pound paper as supplied in Post-It® Easel Pad, product number 559. Such a paper has at least a bleed through resistant coating on the writing side and no coating on the backside. The adhesives of Examples 1, 2 and Comparative Example 1 were coated in the configuration shown in FIG. 5, such that the stripes 218a varied between Example 1, Example 2, and Comparative Example 1. The stripes 218b remained the pressure sensitive adhesive. The stripes 218a had a width of 3/16 inch (0.1875 inch, 0.476 cm). The stripes 218b had a width of 5/8 inch (0.625 inch, 1.59 cm). Between each of the stripes 218a and 218b was a gap of uncoated paper of 3/32 inch (0.09375 inch, 0.238 cm).

A plurality of the sheets of each of the examples was used to form a rectangular pad having 25 inch width and 10 inch long. The stripes of adhesives were coated along the 25 inch dimension of the pad adjacent to and spaced apart from a first (top) periphery edge, e.g., edge 215 in FIG. 5. Each pad was then tested to determine the force needed to separate one sheet from the next sheet by placing the pad on a horizontal surface. A force gauge (Chatillon® model DFE equipped with a 1000 gram load cell from Ametek Inc., Largo, Fla.) was attached to a second (bottom) periphery edge, e.g., edge 216 in FIG. 5 of a topmost sheet in the pad. The force gauge pulled the sheet so as to simulate very closely a 90° peel test. The force required to remove a sheet for each of the sample is shown in Table 2 below.

TABLE 2

| Example No. | Force to separate sheets (grams) |
|---|---|
| 1 | 77 |
| 2 | 45 |
| Comparative 1 | 250 |

What is claimed is:
1. An adhesive blend comprising:
(a) from about 50 to 99 parts by weight pressure sensitive adhesive; and
(b) from about 1 to 50 parts by weight non-tacky, elastomeric microsphere comprising the reaction product of a mixture comprising:
(1) from about 75 to 95 parts by weight alkyl(meth) acrylate comonomer having from about 1 to 14 carbon atoms;
(2) up to about 25 parts by weight multifunctional (meth)acrylate crosslinker selected from the group consisting of di(meth)acrylates, tri(meth)acrylates, tetra(meth)acrylates, divinylbenzene, and combinations thereof;
(3) from about 0.01 to 4.0 wt % initiator; and
(4) from about 0.01 to 3 wt % polymeric stabilizer,
wherein the parts by weight of component (b)(1) and (b)(2) equal 100 parts total, and (b)(3) and (b)(4) are wt % based on the total weight of components (b)(1) and (b)(2),
wherein the pressure sensitive adhesive is selected from the group consisting of: (i) a blend of tacky microspheres and an adhesive binder comprising at least one acrylamide-based moiety, (ii) a water based tacky microsphere, (iii) a solvent based tacky microsphere; and combinations thereof.

2. The adhesive blend of claim 1, wherein the mixture further comprises a surfactant.

3. The adhesive blend of claim 1 comprising from about 75 to 97 parts by weight component (a), from about 3 to 25 parts by weight component (b).

4. The adhesive blend of claim 1, wherein the alkyl(meth)acrylate comonomer is selected from the group consisting of isooctyl acrylate, isononyl (meth)acrylate, isoamyl (meth)acrylate, isodecyl (meth)acrylate, 2-ethylhexyl acrylate, n-butyl (meth)acrylate, sec-butyl (meth)acrylate, propyl (meth)acrylate, ethyl (meth)acrylate, methyl (meth)acrylate, isobornyl (meth)acrylate, 4-methyl-2-pentyl (meth)acrylate, 2-methylbutyl (meth)acrylate, t-butyl (meth)acrylate, and combinations thereof.

5. The adhesive blend of claim 1 disposed on at least a portion of a first surface of a sheet to form an adhesive coating, the sheet selected from the group consisting of paper, polymeric film, woven fabric, non-woven fabric of synthetic or natural materials, metal, metallized polymeric film, and ceramic sheet such that the average diameter of the non-tacky microsphere is greater than the thickness of the adhesive coating.

6. The adhesive blend of claim 1, wherein the pressure sensitive adhesive is a repositionable adhesive.

7. The adhesive blend of claim 1, wherein the polymeric stabilizer is polyacrylamide.

8. The adhesive blend of claim 1, wherein the multifunctional crosslinker is selected from the group consisting of 1,6-hexanediol di(meth)acrylates, butanedioldi(meth)acrylates, poly(ethylene glycol) di(meth)acrylates, polybutadine di(meth)acrylates, polyurethane di(meth)acrylates, propoxylated glycerin tri(meth)acrylates, divinylbenzene, and combinations thereof.

9. A pad comprising a plurality of sheets, each sheet having opposing first and second surfaces, opposing first and second peripheral edges, wherein a band of the adhesive blend of claim 1 is coated on the second surface of the sheet adjacent to one of the peripheral edges.

10. The pad of claim 9 comprising at least one stripe of the adhesive blend and at least one stripe pressure sensitive adhesive.

11. The pad of claim 9 comprising three stripes of adhesive blend and two stripes of pressure sensitive adhesive disposed between the three stripes, and a non-coated gap between each of three stripes and two stripes.

* * * * *

UNITED STATES PATENT AND TRADEMARK OFFICE
CERTIFICATE OF CORRECTION

PATENT NO. : 8,110,280 B2
APPLICATION NO. : 12/056835
DATED : February 7, 2012
INVENTOR(S) : Paul D Graham It is certified that error appears in the above-identified patent and that said Letters Patent is hereby corrected as shown below:

Title page,
Item (57) Abstract, Line 7, delete "and or" and insert -- and/or --, therefor.

In the Specification,
Column 2,
Line 31, delete "micropshere" and insert -- microsphere --, therefor.
Line 36, delete "divinylbeneze," and insert -- divinylbenzene, --, therefor.

Column 3,
Line 38, delete "divinylbeneze," and insert -- divinylbenzene, --, therefor.

Column 4,
Line 27-28, delete "pyrollidone" and insert -- pyrrolidone --, therefor.
Line 31, delete "methycellulose)," and insert -- methylcellulose), --, therefor.
Line 53, delete "N-alkybetaines." and insert -- N-alkylbetaines. --, therefor.

Column 6,
Line 12 (Approx.), delete "pyrolidone," and insert -- pyrrolidone, --, therefor.
Line 29, delete "N.N-dimethyl" and insert -- N,N-dimethyl --, therefor.
Line 56, delete "acetophone." and insert -- acetophenone. --, therefor.

Column 9,
Line 8, delete "and or" and insert -- and/or --, therefor.

Column 10,
Line 63, delete "sufate" and insert -- sulfate --, therefor.

Signed and Sealed this
Fifth Day of August, 2014

Michelle K. Lee
*Deputy Director of the United States Patent and Trademark Office*

Column 11,
Line 6, delete "Perkodox 16" and insert -- Perkadox 16 --, therefor.
Line 9, delete "Philadephia," and insert -- Philadelphia, --, therefor.
Line 10, delete "Perkodox 16" and insert -- Perkadox 16 --, therefor.
Line 12, delete "aklylphenyl" and insert -- alkylphenyl --, therefor.
Line 14, delete "sufate" and insert -- sulfate --, therefor.
Line 50, delete "Was" and insert -- was --, therefor.

In the Claims,
Column 14,
Line 14, In Claim 8, delete "polybutadine" and insert -- polybutadiene --, therefor.